US 9,453,362 B2

(12) United States Patent
Condon et al.

(10) Patent No.: US 9,453,362 B2
(45) Date of Patent: Sep. 27, 2016

(54) SHELTER CURTAIN WALL SYSTEM

(71) Applicant: WEST TAMPA GLASS COMPANY, Tampa, FL (US)

(72) Inventors: Patrick Condon, Oldsmar, FL (US); Anthony R. Campla, Palmetto, FL (US)

(73) Assignee: West Tampa Glass Company, Tampa, FL (US)

( * ) Notice: Subject to any disclaimer, the term of this patent is extended or adjusted under 35 U.S.C. 154(b) by 0 days.

(21) Appl. No.: 14/823,041

(22) Filed: Aug. 11, 2015

(65) Prior Publication Data

US 2016/0145933 A1 May 26, 2016

Related U.S. Application Data

(60) Provisional application No. 62/083,945, filed on Nov. 25, 2014.

(51) Int. Cl.
| | |
|---|---|
| *E06B 3/00* | (2006.01) |
| *E06B 3/66* | (2006.01) |
| *E06B 3/12* | (2006.01) |
| *E06B 3/24* | (2006.01) |
| *E06B 3/677* | (2006.01) |
| *B32B 17/10* | (2006.01) |
| *E04B 2/90* | (2006.01) |
| *E06B 5/12* | (2006.01) |

(52) U.S. Cl.
CPC ........... *E06B 3/66* (2013.01); *B32B 17/10064* (2013.01); *B32B 17/10091* (2013.01); *E04B 2/90* (2013.01); *E06B 3/12* (2013.01); *E06B 3/24* (2013.01); *E06B 3/677* (2013.01); *E06B 5/12* (2013.01)

(58) Field of Classification Search
CPC ........ F41H 5/263; F41H 5/0407; E06B 3/24; E06B 3/5454; E06B 5/12; E06B 3/66; E06B 3/677; E06B 3/12; B32B 17/10064; B32B 17/10091
USPC ......... 52/204.5, 786.1, 786.11, 208, 204.593
See application file for complete search history.

(56) References Cited

U.S. PATENT DOCUMENTS

| | | | |
|---|---|---|---|
| 6,581,342 B1 * | 6/2003 | Tavivian | 52/204.595 |
| 6,737,151 B1 * | 5/2004 | Smith | 428/192 |
| 6,818,268 B2 * | 11/2004 | Gonzalez | 428/34 |
| 7,478,579 B2 * | 1/2009 | Carberry et al. | 89/36.02 |
| 8,846,174 B2 * | 9/2014 | Leighton et al. | 428/76 |
| 2010/0000181 A1 * | 1/2010 | Duncan et al. | 52/786.1 |

* cited by examiner

*Primary Examiner* — Basil Katcheves
(74) *Attorney, Agent, or Firm* — Larson & Larson, P.A.; Frank Liebenow; Patrick Reid

(57) ABSTRACT

A curtain wall system includes a plurality of laminated glass sections or insulated-laminated glass sections, held within a plurality of horizontal extrusions and vertical extrusions. Each laminated glass section includes glass reinforcing bars having a flat bar shape. For insulated-laminated glass, the reinforcing bars have a cross-sectional shape of a 'Z' such that a top cap of the glass reinforcing bars extends over the glass section and a bottom cap of the glass reinforcing bars extends over an opposing side. The laminate glass has a layer of glass, a layer of thermoplastic polymer, another layer of glass and a safety shield. The insulated-laminated glass has an outer layer of glass, a gap, a first inner layer of glass, a layer of thermoplastic polymer, a second inner layer of glass and a safety shield. Such curtain wall systems resist wind loads and wind borne debris from ultimate hurricanes and tornadoes.

8 Claims, 3 Drawing Sheets

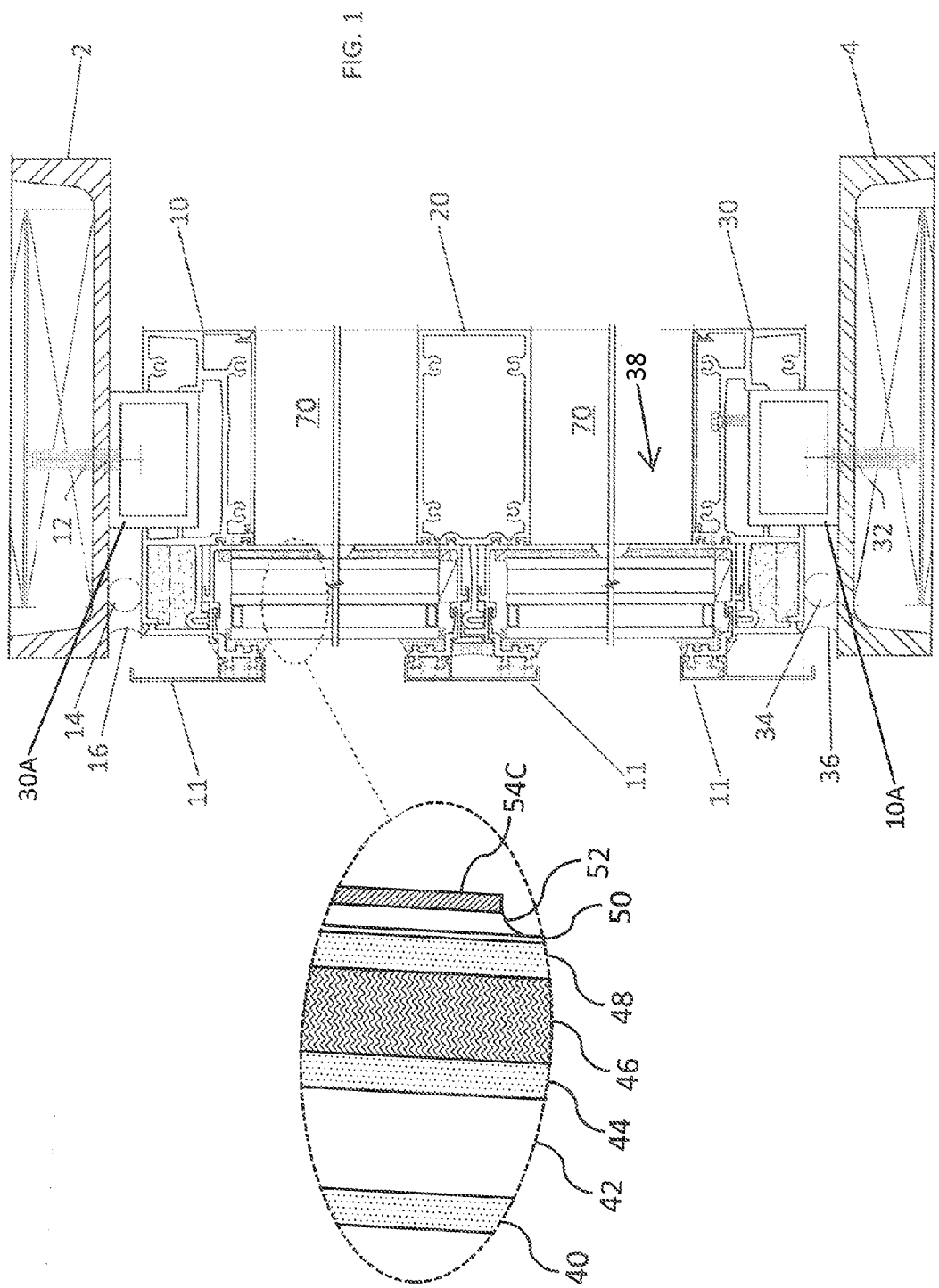

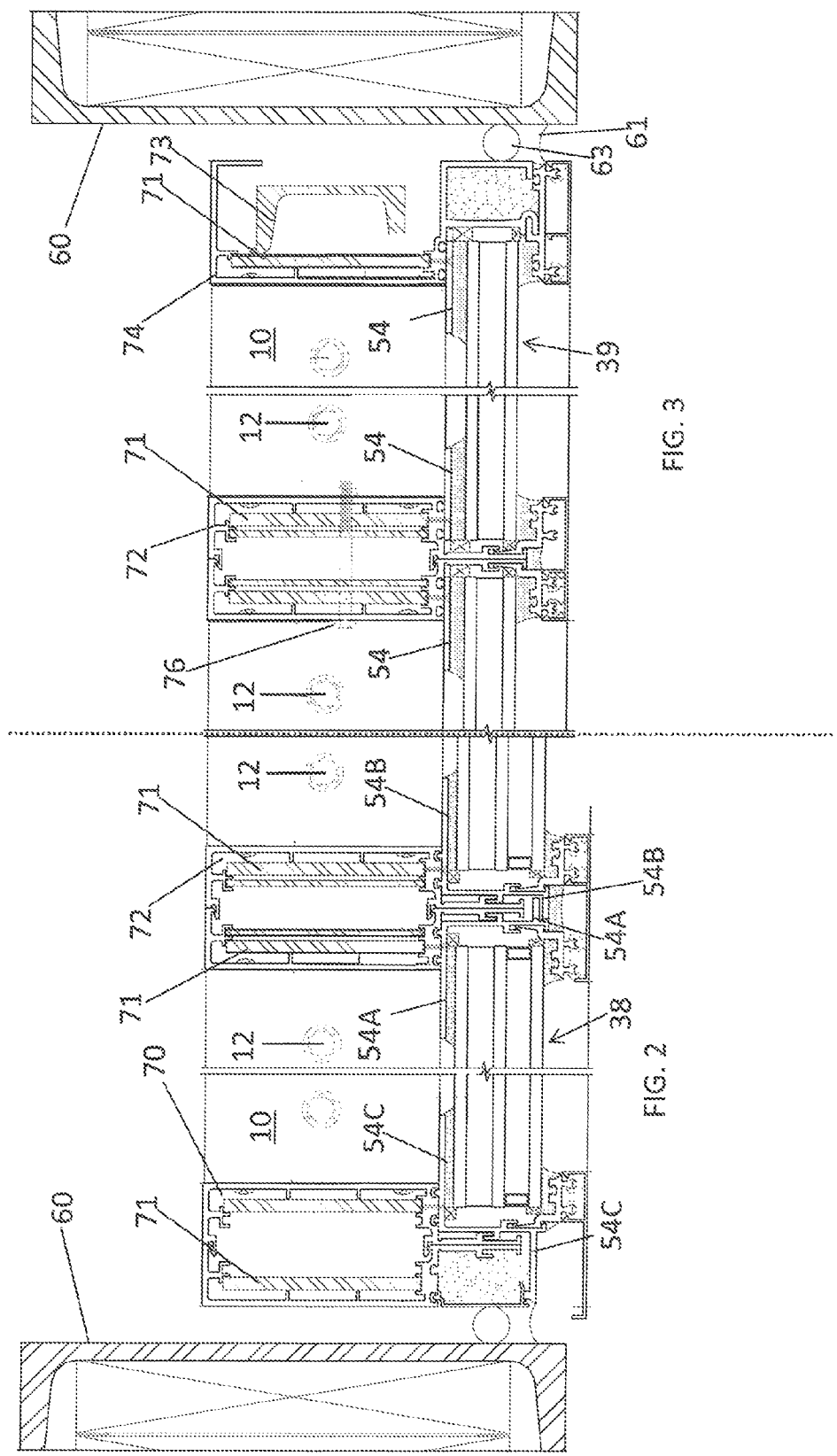

SHELTER CURTAIN WALL SYSTEM

CROSS-REFERENCE TO RELATED APPLICATION

This application claims the benefit of U.S. provisional application No. 62/083,945 filed on Nov. 25, 2014, the disclosure of which is incorporated by reference.

FIELD

This invention relates to the field of windows and more particularly to a shelter curtain wall system capable of withstanding high wind loads and wind borne debris.

BACKGROUND

Previous inventions for impact resistant windows, storefronts and curtain walls focused on wind loads and impact requirements such as TAS201, TAS 202, TAS203 in the Florida Building Code or ASTM E 1886 and 1996. For hurricane protection, this performance correlates to Category 1, 2, and 3 hurricanes and there is no correlation to tornado wind load. Prior laminated glass products by DuPont Corporation include a 'low haze' feature that uses a plastic interlayer between glass layers as described in U.S. Pat. No. 7,214,433, U.S. Pat. Pub. No. 2005118445 and WO99/58334. DuPont refers to this interlayer as thermoplastic polymer or SentryGlas® Plus (SGP). Alternate interlayers were made from polyvinyl butyral. Glass using 'thermoplastic polymer' interlayers is referred, herein, as 'laminated glass.'

The thermoplastic polymer interlayer used in prior applications included 0.09 inches, 0.1 inches, or 0.18 inches in thickness, providing some protection against wind load, and flying debris, as described in the previous paragraph. Early impact applications used solid plastic vision lites but these efforts were generally abandoned in favor of laminated glass. The current invention follows this trend of using laminated glass with thermoplastic polymer in lieu of solid plastic vision lites.

No prior art is known for an impact resistant glass window, storefront or curtain wall, able to withstand loads and impacts up to Category 5 (Saffir-Simpson scale) hurricanes (up to 225 mph USA wind) or EF5 (Enhanced Fujita scale) tornadoes (up to 250 mph USA wind) as described in ICC500 (see below). There are alternative impact resistant window, storefront or curtain walls with solid plastic vision lites but these plastics have the same drawbacks of yellowing and scratching found with the earliest plastic vision lites designed as impact resistant.

What is needed is a glass window system based on a laminated glass with a thermoplastic interlayer that will withstand wind loads and impacts up to Category 5 (Saffir-Simpson scale) hurricanes and/or EF5 (Enhanced Fujita scale) tornadoes with ICC500 performance requirements.

SUMMARY

This invention includes an aluminum curtain wall that was tested with laminated glass and insulated glass to exceed TAS 201, 202 and 203 and, due to enhancement features described here within, now meets the requirements of ICC500. ICC500 is a building code: ICC/NSSA (International Code Council and National Storm Shelter Association) International Standard for the Design and Construction of Storm Shelters, which parallels the federal standard, FEMA 361 (Safe Rooms for Tornadoes and Hurricanes, Guidance for Community and Residential Safe Rooms). TAS 201, 202 and 203 are Testing Application Standards for testing whether products and materials meet Florida Building (impact) Codes.

In one embodiment, a shelter curtain wall is disclosed including a plurality of laminated glass sections, a plurality of horizontal extrusions and a plurality of vertical extrusions. Each of the plurality of laminated glass sections held within the horizontal extrusions and the vertical extrusions.

For laminated glass, each of the horizontal and vertical extrusions includes a glass reinforcing bar supporting the glass. These horizontal and vertical extrusions and the reinforcing bar hold the glass. For laminated glass, there is an outer layer of glass adjacent to a relatively thick layer of thermoplastic polymer, then an inner layer of glass and then a safety shield is covering the inner layer of glass on a side of the inner layer of glass opposing the layer of thermoplastic polymer. An exemplary safety shield is made from low-haze material from Dupont®.

For insulated-laminated glass, each of the horizontal and vertical extrusions include glass reinforcing bars that have a cross-sectional shape of a 'Z' such that a top cap of the reinforcing bars extends over the insulated-laminated glass and a bottom cap of the reinforcing bars extends over an opposing side of the insulated-laminated glass, providing support to the insulated-laminated glass during flexing of the insulated-laminated glass during high winds and/or being struck by flying debris. The insulated-laminated glass includes an outer layer of glass and a mid-layer of glass separated from the outer layer of glass by a gap, filled with air or other gas. Next is a thick layer of thermoplastic polymer adjacent to the mid-layer of glass followed by an inner layer of glass adjacent to the layer of thermoplastic polymer and then a safety shield on the inner layer of glass on a side of the inner layer of glass opposing the layer of thermoplastic polymer.

In some embodiments, the safety shield is a three layer composite structure of a layer of polyvinyl butyral (PVB), a layer of thermo-plastic polyester (PET) and a hardcoat; wherein the hardcoat is chemically resistant and has properties similar to glass, yet protects inhabitants from glass spalling.

The aluminum curtain wall is also anchored, top and bottom, preferably with flex bolts to resist extreme winds as well as the impact from extreme wind borne debris.

BRIEF DESCRIPTION OF THE DRAWINGS

The invention can be best understood by those having ordinary skill in the art by reference to the following detailed description when considered in conjunction with the accompanying drawings in which:

FIG. 1 illustrates a vertical cross section with insulated-laminated glass.

FIG. 2 illustrates a plan view of a horizontal section with insulated-laminated glass.

FIG. 3 illustrates a plan view of a horizontal section with laminated glass.

DETAILED DESCRIPTION

Figure 4:
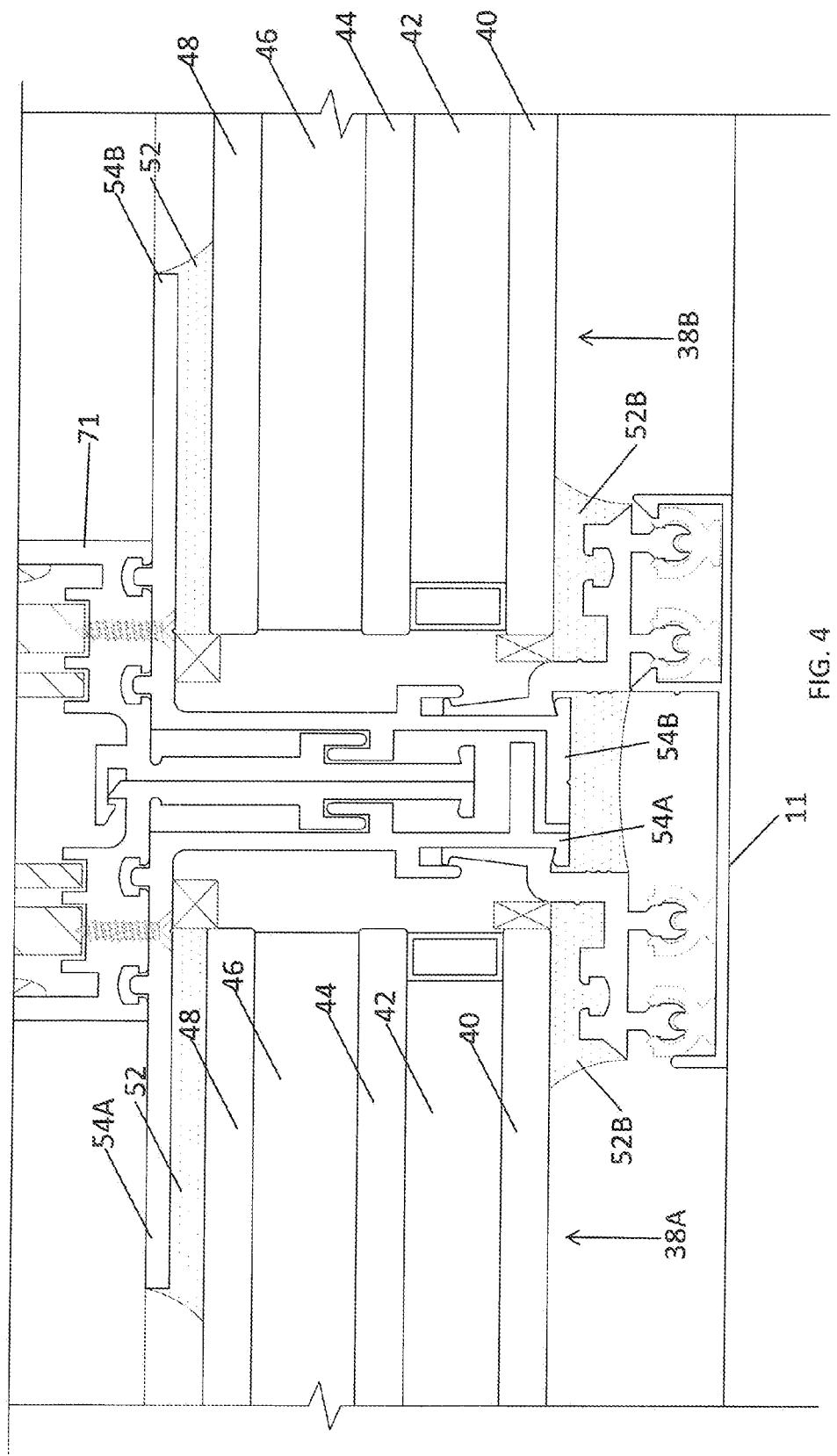
FIG. 4 illustrates a magnified plan view of a horizontal section with insulated-laminated glass.

Reference will now be made in detail to the presently preferred embodiments of the invention, examples of which are illustrated in the accompanying drawings. Throughout the following detailed description, the same reference numerals refer to the same elements in all figures.

Note that, throughout this description, reference to ICC500 is made as per the capabilities of the disclosed system. It is well known that such codes are amended periodically and the intent of the present invention is to meet or exceed the codes currently defined by the International Code Council® (ICC®) and the National Storm Shelter Association (NSSA) as the ICC/NSSA Standard for the Design and Construction of Storm Shelters, known as ICC-500 (ICC500). As ICC500 evolves, it is anticipated that further enhancements be made to the disclosed system to meet further, more stringent standards, as needed.

The disclosed system is related to windows, storefronts and curtain walls designed to resist structural failure or penetration during hurricanes, including hurricanes with forces up to Category 5, and tornadoes including tornadoes with forces categorized as high as EF5. The curtain wall of the disclosed system has performance parameters required by ICC500. The disclosed system meets 220 pounds per square foot design loads as measured by ASTM E 330, 55 pounds per square foot water resistance as measured by ASTM E 331 and impact cycling requirements per ASTM E 1886 (missile parameters and spall limits defined in ICC500).

The disclosed system is a unitized glass curtain wall that can meet the performance requirements of ICC500, namely:
  Wind load resistance, without structural failure, as measured by ASTM E 330 for design pressures up to 220 pounds per square foot and up to a 265 pounds per square foot proof test.
  Water resistance, without leakage, as measured by ASTM E 331 up to 55 pounds per square foot pressure.
  Impact resistance, without penetration, as measured by ASTM E 1886 with maximum parameters from ICC500, namely:
    Tornado: 15 pound, 2×4, impacting up to 100 mph.
    Hurricane: 9 pound, 2×4, impacting up to 112 mph followed by cycling up to 220 psf per ASTM E 1886.
  Spall from above impacts does not pass thru a #70 unbleached Kraft paper witness screen, with surface on a rigid frame, 5 inches from the interior surface of the glass.
  The frame size for the above performance is up to 5'×12'. Frames are pre-glazed curtain wall and unitized i.e. manufactured in a factory.
  The nominal glass size (i.e. laminated glass or insulated laminated glass) for the above performance is 3'×3 to 5'×8' with low haze interlayer and low-haze safety shield materials.
  Both laminated glass and insulated-laminated glass were tested.

DETAILED DESCRIPTION OF THE DRAWINGS

Referring to FIG. 1, vertical sections thru horizontal extrusions 10/20/30 with insulated laminated glass 38 is shown (a plan view is shown in FIG. 2). The insulated laminated glass 38 is shown in detail consisting of an outer layer of glass 40, typically 0.25" thick, a gap 42, typically filled with air or gas, another layer of glass 44, typically 0.25" thick, a layer of thermoplastic polymer 46, another layer of glass 48, typically 0.25" thick, and a safety shield 50. Laminated glass and insulated-laminated glass are supported by reinforcing bars 54/54A/54B/54C. As in FIG. 1 and FIG. 2, the insulated-laminated glass is supported by a Z-shaped reinforcing bar 54C which is sealed to the glass by, for example, silicone 52. Although any glass and glass thickness is anticipated, in some embodiments the outer layer of glass 40 is 0.25" thick tempered glass, optionally having a low-e coating. Although any thickness air/gas gap 42 is anticipated, in one embodiment, the gap 42 is 0.5" thick.

In FIG. 3, vertical sections thru horizontal extrusions 10/20/30 with laminated glass 39 is shown. The laminated glass 39 is shown in detail consisting of an outer layer of glass 44, typically 0.25" thick, a layer of thermoplastic polymer 46, and another layer of glass 48, typically 0.25" thick, and a safety shield 50. The laminated glass is supported by a reinforcing bar, 54, which is sealed to the glass by, for example, silicone 52.

In prior insulated-laminated glass and laminated glass, the thickness of the layer of thermoplastic polymer 46 is typically 0.09 inches or 0.10 inches thick, as such materials are readily available, for example, a material produced by DuPont made of thermoplastic polymer known as Sentry-Glas® Plus (SGP), which is available in 0.09 inch or 0.10 inch thick sheet or rolls. This thickness is not sufficient for projectiles and flying objects that are typical in very strong hurricanes and tornadoes. To achieve penetration resistance to, for example, 2×4 boards hurled at the disclosed laminated glass 38/39 (e.g., at 100 miles per hour), several layers of the prior known thermoplastic polymer interlayer (e.g. SGP) are sandwiched together to form a single layer of laminate that is between 0.40 to 0.70 inches. For example, the above noted testing was performed with a laminate of SGP that is 0.54 inches thick (e.g., six layers of 0.09 inch thick laminates).

Note that in FIG. 1, the outline of the vertical or jamb extrusion 70 is visible, though at other locations other vertical/jamb extrusions 72/74 are visible.

Referring to FIGS. 1-3, the frame includes metal extrusions both horizontal (10/20/30) and vertical (70/72/74) that are preferably made of aluminum. The head horizontal extrusion 10 is affixed to the header 2 (e.g., steel header substrate 2) by, for example, flex bolts 12. Likewise, the sill horizontal extrusion 30 is affixed to the footer or sill 4 (e.g., steel sill substrate 4) by, for example, flex bolts 32. In most installations, facades 11 (beauty caps 11) are affixed to the metal extrusions 10/20/30/70/72/74 for appearance reasons.

In some embodiments, a gasket 14 is positioned between the head horizontal extrusion 10 and the header 2 before torqueing of the flex bolts 12. Likewise, in some embodiments, a gasket 34 is positioned between the sill horizontal extrusion 30 and the footer 4 before torqueing of the flex bolts 32. For further reduction of fluid penetration, an optional amount of silicone 16/36/61 is also applied.

Referring to FIGS. 2 and 3, plan views of vertical sections 70/72/74 are shown with insulated-laminated glass 38 (FIG. 2) and laminated glass 39 (FIG. 3). In FIG. 1, the vertical extrusions (or jambs) are shown in cross section against the head horizontal extrusion 10, as visible with flex bolts 12. In FIGS. 2, 3, and 4, cross sectional views of the glass reinforcing bars 54C/54A/54B/54 are visible, details of which are shown for insulated-laminated glass in FIG. 4 for 54A/54B. The glass reinforcing bars 54C/54A/54B hold the insulated laminated glass 38 within the frame formed by the vertical extrusions (or jambs) 70/72/74 and the horizontal extrusions 10/20/30. The glass reinforcing bars 54C/54A/54B extend behind the insulated-laminated glass 38 (the interior space side) to support the insulated-laminated glass 38 during high winds and/or impacts from flying debris. When high winds and/or flying debris occur, it is known that any glass (e.g., insulated-laminated glass 38 or laminated glass 39) will bow under such forces. Such bowing causes the outer dimension of the glass to temporarily shrink until the force abates. The glass reinforcing bars 54C/54A/54B/54 hold the insulated-laminated glass 38 and laminated glass 39 during such episodes and provides structural support. The back surface of the glass reinforcing bars 54C/54A/54B is interfaced to the insulated-laminated glass 38 with a silicone material. In the case of insulated-laminated glass, the front surface of the glass reinforcing bars 54C/54A/54B interfaces with a front surface of the extrusions 70/72/74 providing additional force resistance and preventing the glass from popping out.

Note in FIGS. 2 and 3, in the intermediate vertical extrusions 72, two reinforcing bars 54A/54B overlap each other to support opposing panes of insulated-laminated glass 38.

One end jamb vertical extrusion 70 is sealed to one jamb-substrate 60 of the opening while another end jamb vertical extrusion 74 is sealed to an opposing jamb-substrate 60 of the opening. Again, optional gaskets 63 and/or silicone 61 are used to seal the opening.

The vertical extrusions 70/72/74 are made from any known stiff material, preferably aluminum. In some embodiments, reinforcement bars 71 are installed within the vertical extrusions 70/72/74 to provide additional strength (as shown). Additionally, in some embodiments, a reinforcement channel 73 is included, typically welded to the reinforcement bar 71. Although any structurally suitable material is anticipated, it is preferred that the reinforcement bars 71 and reinforcement channels 73 be made of steel or iron.

In FIG. 2, the intermediate vertical extrusion 72 is shown without a connecting bolt 76, while in FIG. 3, the intermediate vertical extrusion 72 is shown with a connecting bolt 76. The connecting bolt 76 is optional and provides added strength to the system and in some embodiments is located in horizontal sill 10, horizontal 20 or horizontal head 30.

FIG. 4 illustrates a magnified plan view of a vertical section 72 with insulated-laminated glass 38 is shown. In this view, further detail of the intermediate vertical extrusion 72 is shown. Note how the glass reinforcing bars 54A/54B extend beyond the internal edge of the laminated glass 38A/38B, reducing the possibility of the laminated glass 38 from popping out. The outside portion of the extrusions 10,20,30,70,72,74 are capped with a façade 11 (beauty cap). The front portion of the intermediate vertical extrusion 72 (with reinforcing bars 54A/54B) also overlaps the laminated glass 38A/38B and is sealed with silicone 52B.

It is anticipated that the vertical sections 70/72/74, and the insulated-laminated glass 38 or the laminated glass 39 be assembled and caulked (silicone) at the factory along with the reinforcing bars 54C/54A/54B/54. The assemblies are then transported to field where the anchor blocks 10A/30A are snapped in 10/30 and bolted into the respective substrate header 2 and substrate footer 4. After installation, the beauty caps are installed onto the horizontal extrusions 10/20/30 and vertical sections 70/72/74.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A shelter curtain wall comprising:
    a plurality of sections of laminate glass, each section of laminate glass comprising:
        an outer planar layer of glass;
        a planar layer of thermoplastic polymer having a first side and a second side, the first side of the planar layer of thermoplastic polymer is adjacent to the outer planar layer of glass;
        an inner planar layer of glass is adjacent to the second side of the planar layer of thermoplastic polymer;
        a third planar layer of glass positioned at a distance from the outer planar layer of glass forming a gap between the third planar layer of glass and the outer planar layer of glass, the gap filled with air or gas;
        a spall shield on the inner planar layer of glass on a side of the inner planar layer of glass opposite of the planar layer of thermoplastic polymer;
    a plurality of horizontal metal extrusions and a plurality of vertical metal extrusions, each of the plurality of sections of the laminated glass held within corresponding framing made by the horizontal metal extrusions and the vertical metal extrusions; and
    reinforcing bars have a cross-sectional shape of a 'Z' such that a top cap of each of the glass reinforcing bars overlaps a corresponding section of the laminate glass and is bonded to the inner planar layer of the corresponding section of the laminate glass; and a bottom cap of the reinforcing bars extends over a front surface of an outward facing side of a corresponding extrusion, the reinforcing bars for retaining the corresponding section of the laminate glass during bending of the corresponding section of the laminate glass upon stress from being hit by flying objects.

2. The shelter curtain wall of claim 1, wherein the top cap of each of the glass reinforcing bars is sealed to the inner layer of glass by silicon sealant.

3. The shelter curtain wall of claim 1, wherein the planar layer of thermoplastic polymer comprises multiple layers of thermoplastic polymer.

4. The shelter curtain wall of claim 3, wherein the gap is from 0.25 to 0.75 inch thick.

5. The shelter curtain wall of claim 1, wherein the planar layer of thermoplastic polymer has a total thickness of from 0.4 inches to 0.7 inches.

6. The shelter curtain wall of claim 1, wherein the planar layer of thermoplastic polymer has a total thickness of approximately 0.54 inches.

7. The shelter curtain wall of claim 1, wherein the outer planar layer of glass is selected from the group consisting of tempered glass, heat strengthened glass, and annealed glass and the outer planar layer of glass has a thickness of from 0.125 to 0.375 inches.

8. The shelter curtain wall of claim 1, wherein the third layer of planar glass is selected from the group consisting of tempered glass, heat strengthened glass, annealed glass, and laminated glass; and the third layer of planar glass is from 0.125 inches to 0.75 inches thick.

* * * * *